(12) United States Patent  
Pearson et al.

(10) Patent No.: US 8,115,489 B2
(45) Date of Patent: Feb. 14, 2012

(54) DETECTOR FOR DETECTING A CURRENT CARRYING CONDUCTOR AND A METHOD OF VALIDATING OPERATION OF THE DETECTOR

(75) Inventors: Richard David Pearson, Bristol (GB); Kevin Conway, Newport (GB)

(73) Assignee: Radiodetection Limited, Bristol (GB)

( * ) Notice: Subject to any disclaimer, the term of this patent is extended or adjusted under 35 U.S.C. 154(b) by 295 days.

(21) Appl. No.: 12/395,838

(22) Filed: Mar. 2, 2009

(65) Prior Publication Data

US 2010/0060285 A1 Mar. 11, 2010

(30) Foreign Application Priority Data

Feb. 29, 2008 (GB) .................................... 0803873.9

(51) Int. Cl.
*G01V 3/08* (2006.01)
(52) U.S. Cl. ........................................................ 324/326
(58) Field of Classification Search .................... None
See application file for complete search history.

(56) References Cited

U.S. PATENT DOCUMENTS

| | | | |
|---|---|---|---|
| 4,387,340 A | 6/1983 | Peterman | |
| 5,043,666 A | 8/1991 | Tavernetti et al. | |
| 5,541,516 A | 7/1996 | Rider et al. | |
| 6,728,662 B2* | 4/2004 | Frost et al. | 324/66 |
| 7,091,872 B1* | 8/2006 | Bigelow et al. | 340/664 |
| 7,336,078 B1 | 2/2008 | Merewether et al. | |
| 7,342,537 B2* | 3/2008 | Pearson et al. | 342/459 |
| 7,403,012 B2* | 7/2008 | Worsley et al. | 324/326 |
| 7,847,556 B2* | 12/2010 | Royle | 324/326 |
| 7,969,137 B2* | 6/2011 | Royle | 324/329 |
| 7,994,770 B2* | 8/2011 | Royle et al. | 324/329 |
| 2003/0058961 A1* | 3/2003 | Fling et al. | 375/316 |
| 2006/0284610 A1* | 12/2006 | Thompson et al. | 324/67 |
| 2006/0284616 A1* | 12/2006 | Pearson et al. | 324/326 |
| 2007/0290672 A1* | 12/2007 | Worsley et al. | 324/67 |
| 2009/0243583 A1* | 10/2009 | Olsson et al. | 324/67 |
| 2010/0001712 A1* | 1/2010 | Royle et al. | 324/67 |
| 2010/0001713 A1* | 1/2010 | Royle | 324/67 |
| 2010/0001714 A1* | 1/2010 | Royle | 324/67 |
| 2010/0001731 A1* | 1/2010 | Royle et al. | 324/326 |
| 2010/0001732 A1* | 1/2010 | Royle et al. | 324/326 |
| 2010/0004880 A1* | 1/2010 | Royle et al. | 324/326 |

FOREIGN PATENT DOCUMENTS

| | | |
|---|---|---|
| DE | 202004006336 U1 | 8/2004 |
| EP | 0036257 A1 | 9/1981 |
| EP | 0735377 A2 | 3/1996 |
| FR | 2349841 A1 | 12/1977 |
| JP | 2006-275959 A | 10/2006 |

OTHER PUBLICATIONS

"RD4000 Locating System User Manual, Rev 3," Radiodetection Limited, Oct. 2002.

* cited by examiner

*Primary Examiner* — Jermele M Hollington
(74) *Attorney, Agent, or Firm* — Baker & Hostetler LLP

(57) ABSTRACT

A detector for detecting a buried conductor comprises a plurality of antennas B, T. Each antenna B, T has a winding wound around the antenna, the winding being connected to a current source for providing a predefined current in the winding. When the predefined current is applied to the winding an electromagnetic field is generated at the antenna which induces a test current in the antenna. The test current is compared to calibration data stored in the detector to validate the correct operation of the detector.

20 Claims, 2 Drawing Sheets

DETECTOR FOR DETECTING A CURRENT CARRYING CONDUCTOR AND A METHOD OF VALIDATING OPERATION OF THE DETECTOR

CROSS REFERENCE TO RELATED APPLICATIONS

This application claims priority to United Kingdom Patent Application GB 0803873.9, filed on Feb. 29, 2008, and entitled "A Detector for Detecting a Current Carrying Conductor and a Method of Validating Operation of the Detector," the disclosure of which is incorporated herein by reference in its entirety.

FIELD OF THE INVENTION

The present invention relates to a detector for detecting a current carrying conductor and a method of validating operation of the detector.

BACKGROUND OF THE INVENTION

Before commencing excavation or other work where electrical cables, fibre optic cables or other utilities ducts or pipes are buried, it is important to determine the location of such buried cables or pipes to ensure that they are not damaged during the work.

Current carrying conductors emit electromagnetic radiation which can be detected by an electrical antenna. If fibre optic cables or non-metallic utilities ducts or pipes are fitted with a small electrical tracer line, an alternating electrical current can be induced in the tracer line which in turn radiates electromagnetic radiation. It is known to use detectors to detect the electromagnetic field emitted by conductors carrying alternating current.

Once a buried utility is located the depth of the utility can be calculated to determine a safe excavation depth. It is important that the depth information provided to the operator is accurate so as to avoid damage to the buried utility or injury to person when excavating the area.

SUMMARY OF THE INVENTION

Embodiments of the present invention advantageously provide a detector for detecting a current carrying conductor and a method of validating operation of the detector.

According to a first aspect of the invention there is provided a detector for detecting a buried conductor, the detector comprising: a plurality of antennas for detecting an electromagnetic field; a plurality of windings, each wound around a respective antenna, each winding being connected to a current source for providing a predefined current in the winding to generate an electromagnetic field at the antenna, thereby inducing a test current in the antenna; a memory for storing calibration data of the antennas; and a processor configured to process the test currents in the antennas to determine if the test currents are within predetermined limits of the calibration data.

The predetermined limits for each antenna may be the calibration data ±0.01%.

The processor may be configured to disable the detector if one of the test currents is outside the predetermined limits of the calibration data.

The plurality of antennas may comprise two or three parallel antennas which in use are oriented horizontally and spaced vertically.

The processor may be configured to store results of the test in the memory.

The detector may further comprise a user interface for conveying the results of the test to a user and a communications module for transmitting results of the test to another device.

According to a second aspect of the invention there is provided a system for validating the operation of a detector as defined above, the system comprising: a microprocessor-controlled device having a communications module for communicating with the communications module of said detector and a communications module for accessing a network, wherein the device is configured to receive test results from said detector and transmit the test results to said network.

The system may further comprise a server connected to said network, wherein the server is configured to receive test results from the microprocessor-controlled device. The server may be configured to generate a calibration certificate if the test results indicate that said detector is operating within predetermined limits, the calibration certificate being downloadable from the server to the microprocessor-controlled device. The network may be the Internet.

According to a third aspect of the invention there is provided a method of validating the operation of a detector for detecting a buried conductor as defined above, the method comprising: providing a predefined current in the winding to generate an electromagnetic field at each antenna, thereby inducing a test current in each antenna; and processing the test currents to determine if the test currents are within predetermined limits of the calibration data.

The predetermined limits for each antenna may be the calibration data ±0.01%. The processor may disable the detector if one of the test currents is outside the predetermined limits of the calibration data.

The plurality of antennas may comprise two or three parallel antennas which in use are oriented horizontally and spaced vertically.

The processor may store results of the test in the memory and the test may be conveyed to a user via a user interface.

The method may further comprise: providing the detector with a communications module; providing a microprocessor-controlled device having a communications module for communicating with the communications module of the detector; and transmitting the results of the test from the detector to the microprocessor-controlled device via the communications modules.

The method may further comprise: providing the microprocessor-controlled device with a communications module for accessing a network; and transmitting results of the test from the microprocessor-controlled device to said network.

The method may further comprise: providing a server connected to said network; and transmitting results of the test from the microprocessor-controlled device to the server over said network.

The method may further comprise: generating a calibration certificate at the server if the test results indicate that the detector is operating within predetermined limits and downloading the calibration certificate from the server to the microprocessor-controlled device. The network may be the Internet.

The detector described above may further comprise a housing in which the other components of the detector are housed, wherein the detector is portable.

According to a further aspect of the invention there is provided a system for detecting a buried conductor comprising: a transmitter for generating an alternating current test signal in said conductor; and a detector as defined above for detecting the signal generated in said buried conductor by the transmitter.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
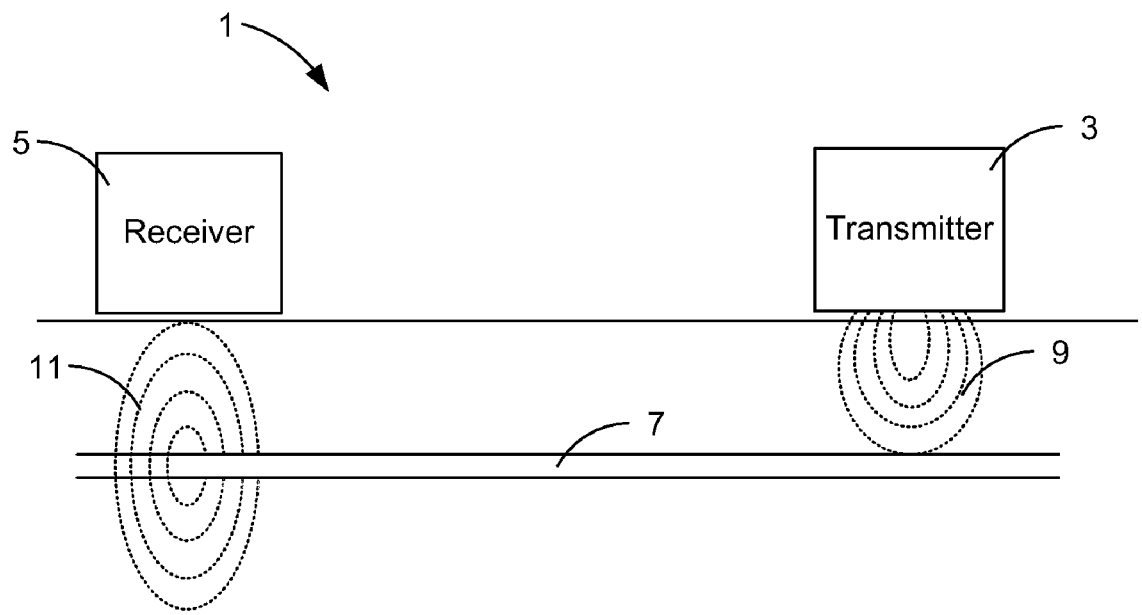
FIG. 1 is a schematic representation of a detector system for detecting a buried conductor according to an embodiment of the invention.

The invention will now be described with reference to the drawing figures, in which like reference numerals refer to like parts throughout.

FIG. 1 is a schematic representation of a system 1 for detecting a buried conductor according to an embodiment of the invention, comprising a portable transmitter 3 and a portable receiver/detector 5. The transmitter 3 is placed in proximity to a buried conductor 7 to produce an alternating current test signal in the buried conductor 7.

An aerial in the transmitter 3 is fed with an AC voltage to produce an electromagnetic field 9 which links with the buried conductor 7, thereby inducing the alternating current test signal in the buried conductor 7. The alternating current test signal is radiated as an electromagnetic field 11 by the buried conductor 7 and this electromagnetic field can be detected by the receiver 5. In other embodiments the transmitter may provide a test signal in the conductor by direct connection to the conductor or by clamping around the conductor, as is known in the art.

Figure 2:
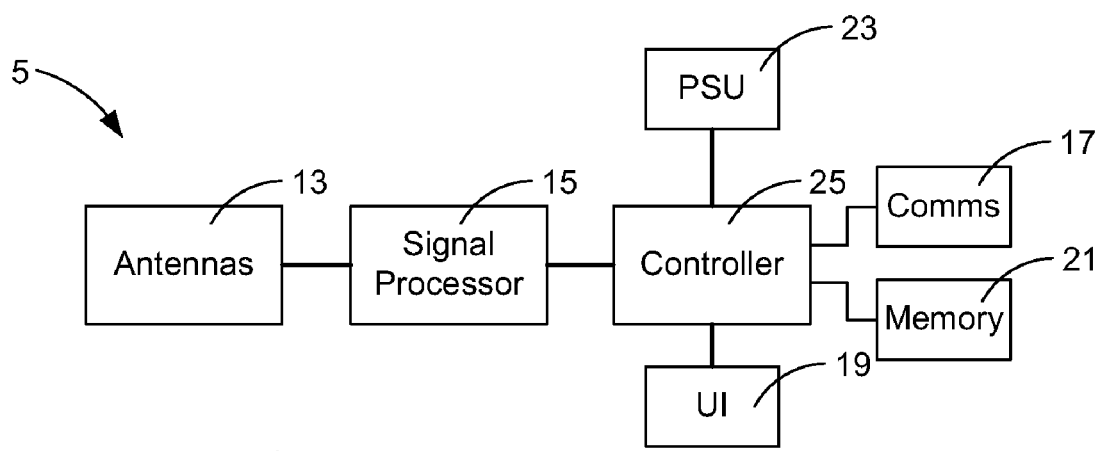
FIG. 2 is a block diagram of the detector of the system of FIG. 1.

FIG. 2 is a block diagram of the receiver 5 of the system 1 of FIG. 1. An electromagnetic field 11 radiated by the buried conductor 7 is detected by a plurality of antennas in an antenna module 13. Each antenna outputs a field strength signal representative of the electromagnetic field 11 at the antenna. The outputs from the antenna module 13 are fed into a signal processor module 15 for isolating signals of a desired frequency band or bands and processing these signals to derive their characteristics using known techniques. The signal processor module 15 may comprise a pre-amplification stage for amplifying the field strength signals output from the antennas if the detected signal is weak. The signal processor module 15 may further comprise an analogue to digital converter for converting the field strength signals into digital signals and a digital signal processor for processing the digitised signals.

The receiver comprises a communications module 17 to provide a communication/data link between the receiver 5 and a microprocessor-controlled device such as a personal computer (PC) or a personal digital assistant (PDA) (not shown). The communication link may be implemented via a wired or wireless connection. Additionally the communications module 17 may provide a communication link with the transmitter 3.

A user interface module 19 is provided to convey information to the operator of the receiver 5 and may comprise one or more of a display for displaying information to the operator of the device, input devices such as a keypad or a touch sensitive screen and an audible output device such as a speaker or beeper. The receiver 5 further comprises a memory module 21 and a power supply unit (PSU) 23 comprising power management circuitry and a power source such as batteries. The overall control of the various components of the receiver 5 is managed by a controller 25.

Figure 3:
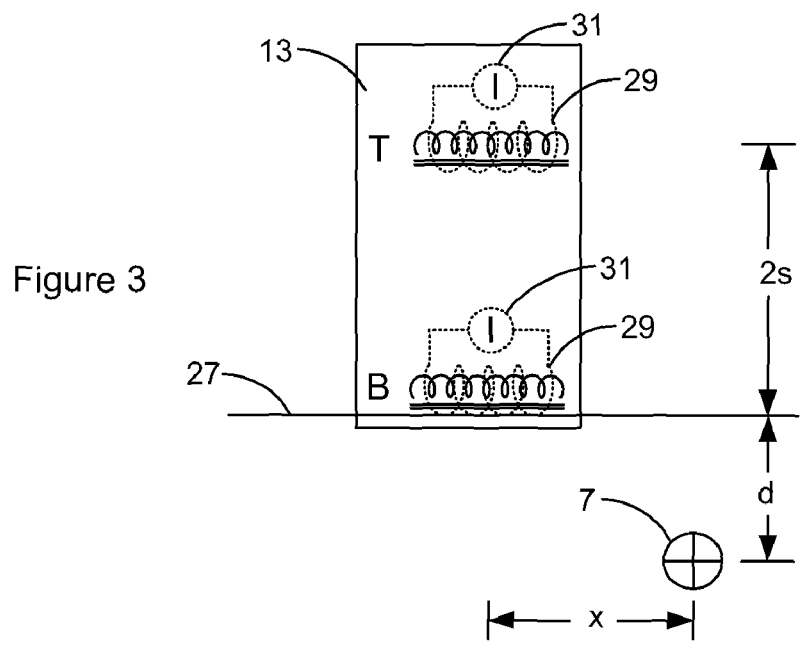
FIG. 3 is a representation of two antennas of the detector of FIG. 2.

When the receiver is located over a current carrying conductor which radiates an electromagnetic field, the depth of the conductor can be calculated using known techniques by comparing the current induced in at least two of the antennas in the antenna module 13. FIG. 3 shows an antenna module 13 of a detector 5 comprising two horizontal vertically spaced antennas B, T. In use the detector 5 is held vertical on ground 27 in which a current carrying conductor 7 is buried, with the bottom antenna B close to the surface of the ground 27. The axes of the antennas are parallel and the separation between the bottom antenna B and the top antenna T is 2s. The conductor 7 is buried at a depth d below the surface of the ground 27 (and below the bottom antenna B) and the horizontal displacement between the antennas B and T and the conductor 7 is x. The components of the portable detector 5 are housed in a housing (not shown).

When an alternating current flows in the conductor 7 and the conductor 7 radiates an electromagnetic field, the magnetic flux density or magnetic field at the bottom antenna B is $B_B$ and the magnetic flux density at the top antenna T is $B_T$. The depth of the buried conductor 7 below the surface 27 of the ground is given by:

$$d = \frac{2s}{\frac{B_B(x,d)}{B_T(x,d)} - 1}$$

It can be seen from the above equation that in order to produce an accurate depth calculation the outputs from the bottom antenna B and the top antenna T must be correctly calibrated with respect to each other. The calibration of the top antenna T relative to the bottom antenna B is performed when the detector is set up after manufacture and factory calibration data is stored in the memory 21. This invention provides a detector which can perform a self-test to ensure that the calibration of the antennas is within acceptable limits and a method of validating the operation of the detector.

In the detector 5 of FIGS. 2 and 3 each antenna B, T is provided with a winding 29 (shown in dotted lines) which is wound around the ferrite of the antenna and connected to a precision current source 31 (shown in dotted lines) to provide an integrated built-in test capability. After the relative calibration of the top antenna T and the bottom antenna B is performed in the factory, separate calibration data is generated in the factory for the top antenna T and for the bottom antenna B by using the precision current source 31 of each antenna to generate a known, predefined current in the winding 29 and recording the current induced in the antennas B, T. This calibration data is stored in the memory 21 of the detector 5 so that it is available for future calibration self-tests.

If it is desired to check that the detector 5 is still performing within its calibration limits then the user initiates the calibration procedure through the user interface 19. The predefined test current is generated by the precision current sources 31 and passed through the windings 29 to produce electromagnetic fields at the antennas B, T which induces test currents in the respective antennas B, T. The test currents output from the antennas B, T are compared to the factory calibration data stored in the memory 21 for each antenna B, T to verify that the currents are within predetermined limits of the factory calibration data. If the currents output from both of the antennas B, T are within the predetermined limits then the calibration test is deemed to be a pass. The predetermined limit for each antenna is that the test current is within the factory calibration data ±0.01% (i.e., 1 part in 10,000). If the current output from one of the antennas B, T is not within the predetermined limits then the calibration test is deemed to be a fail. The results of the integrated built-in test are conveyed to the user by means of the user interface 19 and stored in the memory 21. If the detector 5 fails the integrated built-in test then a warning is displayed to indicate that the detector 5 is out of calibration. Alternatively or additionally the controller 25 may lock the detector 5 to prevent its use until the detector is recalibrated and the integrated built-in test is passed.

Figure 4:
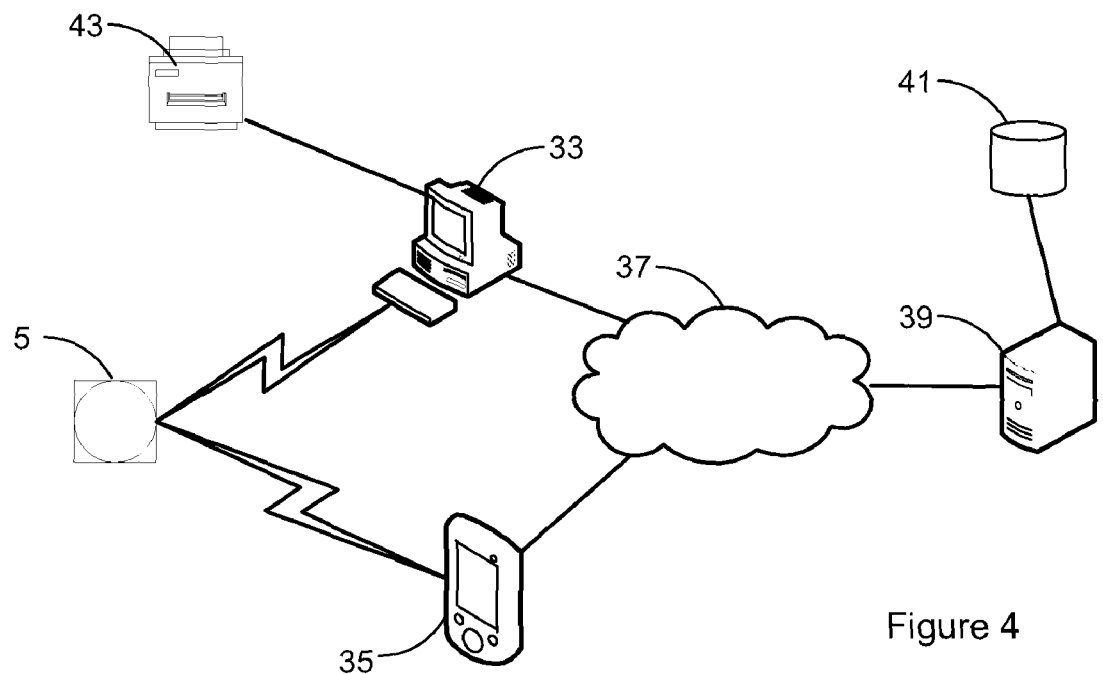
FIG. 4 shows a system for validating operation of the detector of FIG. 2.

FIG. 4 shows a system for validating the operation of the detector of FIG. 2. The detector 5 communicates via its communications module 17 with a communications module of a PC 33, a PDA 35 or other microprocessor-controlled device (not shown). In the system of FIG. 4 the detector 5 communicates wirelessly with the PC 33 and PDA 35 but in other embodiments the detector 5 may communicate via a wired connection.

The PC 33 and PDA 35 are connected or connectable via a network 37, such as the Internet, to a server 39. The server 39 can access a storage device 41.

The results of the calibration test together with an identifier of the detector 5, such as a serial number, can be uploaded from the memory 21 of the detector 5 to the PC 33 or PDA 35 and from there via the network 37 to a server 39 so that the results can be stored in the memory 41 associated with the server 39 to record the test results and whether the detector 5 passed or failed the calibration test on the date in question. If the calibration test was passed then the server 39 can generate a test pass certificate which can be downloaded to the PC 33 or PDA 35. A printer 43 connected to the PC 33 can print the calibration certificate to show that the detector 5 passed the calibration test on the date in question.

Various modifications will be apparent to those in the art and it is desired to include all such modifications as fall within the scope of the accompanying claims.

For example, the detector 5 shown in the Figures comprises two parallel horizontal antennas. It will be understood by a person skilled in the art that the detector may comprise three parallel horizontal antennas or more and that some or all of the antennas may comprise a winding wound around the ferrite of the antenna and connected to a precision current source to provide an integrated built-in test capability for some or all of the antennas.

Aspects of the present invention can be implemented in any convenient form, for example using dedicated hardware, or a mixture of dedicated hardware and software. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

We claim:

1. A system for detecting a buried conductor, comprising:
   a detector, including:
      a plurality of antennas for detecting an electromagnetic field,
      a plurality of windings, each wound around a respective antenna, each winding being connected to a current source for providing a predefined current in the winding to generate an electromagnetic field at the antenna, thereby inducing a test current in the antenna,
      a memory for storing calibration data of the antennas,
      a processor configured to process the test currents in the antennas to determine if the test currents are within predetermined limits of the calibration data, and
      a communications module for transmitting calibration test results; and
   a microprocessor-controlled device for receiving the calibration test results from the detector.

2. The system according to claim 1, wherein the predetermined limits for each antenna are the calibration data ±0.01%.

3. The system according to claim 1, wherein the processor is configured to disable the detector if one of the test currents is outside the predetermined limits of the calibration data.

4. The system according to claim 1, wherein the plurality of antennas comprise two parallel antennas which in use are oriented horizontally and spaced vertically.

5. The system according to claim 1, wherein the plurality of antennas comprise three parallel antennas which in use are oriented horizontally and spaced vertically.

6. The system according to claim 1, wherein the processor is configured to store results of the test in the memory.

7. The system according to claim 1, wherein the detector further comprises a user interface for conveying the calibration test results to a user.

8. The system according to claim 1, further comprising:
a transmitter for generating an alternating current test signal in said conductor.

9. The system according to claim 1, further comprising a server connected to a network, wherein the microprocessor-controlled device transmits the calibration test results to the server over the network.

10. The system according to claim 9, wherein the server is configured to generate a calibration certificate if the test results indicate that said detector is operating within predetermined limits.

11. The system according to claim 10, wherein the calibration certificate is downloadable from the server to the microprocessor-controlled device.

12. A method of validating the operation of a detector for detecting a buried conductor, the detector including a plurality of antennas, a plurality of windings, each winding wound around a respective antenna and connected to a current source, a memory, a processor and a communications module, the method comprising:
providing a predefined current in the winding to generate an electromagnetic field at each antenna, thereby inducing a test current in each antenna;
processing the test currents to determine if the test currents are within predetermined limits of the calibration data; and
transmitting calibration test results from the detector to a microprocessor-controlled device.

13. The method according to claim 12, wherein the predetermined limits for each antenna are the calibration data ±0.01%.

14. The method according to claim 12, further comprising disabling the detector if one of the test currents is outside the predetermined limits of the calibration data.

15. The method according to claim 12, wherein the plurality of antennas comprise two parallel antennas which in use are oriented horizontally and spaced vertically.

16. The method according to claim 12, further comprising storing the calibration test results in the memory.

17. The method according to claim 12, further comprising conveying the calibration test results to a user via a user interface.

18. The method according to claim 12, further comprising:
transmitting the calibration test results from the microprocessor-controlled device to a server over a network.

19. The method according to claim 18, further comprising:
generating a calibration certificate at the server if the calibration test results indicate that the detector is operating within predetermined limits.

20. The method according to claim 19, further comprising:
downloading the calibration certificate from the server to the microprocessor-controlled device.

* * * * *